(12) United States Patent
Yan et al.

(10) Patent No.: US 11,943,749 B2
(45) Date of Patent: Mar. 26, 2024

(54) METHOD OF TRANSMITTING DATA OVER INDICATED RESOURCE BLOCKS

(71) Applicant: LENOVO (BEIJING) LIMITED, Beijing (CN)

(72) Inventors: Zhi Yan, Beijing (CN); Hongmei Liu, Beijing (CN); Haipeng Lei, Beijing (CN); Yingying Li, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 125 days.

(21) Appl. No.: 17/265,041

(22) PCT Filed: Aug. 1, 2018

(86) PCT No.: PCT/CN2018/098139
§ 371 (c)(1),
(2) Date: Feb. 1, 2021

(87) PCT Pub. No.: WO2020/024193
PCT Pub. Date: Feb. 6, 2020

(65) Prior Publication Data
US 2021/0329605 A1    Oct. 21, 2021

(51) Int. Cl.
*H04W 72/04*    (2023.01)
*H04L 1/1867*    (2023.01)
(Continued)

(52) U.S. Cl.
CPC ........... *H04W 72/04* (2013.01); *H04L 1/1874* (2013.01); *H04L 5/0044* (2013.01); *H04L 25/03866* (2013.01)

(58) Field of Classification Search
CPC .... H04W 72/04; H04L 1/1874; H04L 5/0044; H04L 25/03866; H04L 1/0016;
(Continued)

(56) References Cited

U.S. PATENT DOCUMENTS

| 2001/0024475 | A1* | 9/2001 | Kumar | ...................... H03D 5/00 375/270 |
| 2006/0045169 | A1* | 3/2006 | Kim | ...................... H04B 1/7103 375/267 |

(Continued)

FOREIGN PATENT DOCUMENTS

| CN | 1082354433 A | 6/2018 |
| WO | 2013100623 A1 | 7/2013 |

OTHER PUBLICATIONS

3GPP, 3rd Generation Partnership Project; Technical Specification Group Radio Access Network; Introduction of HRLLC Info 36.211 3GPP R1-1807945 May 21-25, pp. 1-13.
(Continued)

*Primary Examiner* — Ian N Moore
*Assistant Examiner* — Sun Jong Kim
(74) *Attorney, Agent, or Firm* — Kunzler Bean & Adamson

(57) ABSTRACT

Method and apparatus for data transmission are disclosed. One method of a network equipment includes scrambling and modulating coded bits to generate data; mapping the data into a first resource block and a second resource block, both of which forms a resource block, wherein the first resource block is from a symbol with an indicated index to a symbol with an end index of the resource block, the second resource block is from a symbol with a start index to a symbol with the indicated index minus one of the resource block; and transmitting the data in the resource blocks.

20 Claims, 8 Drawing Sheets

(51) Int. Cl.
  *H04L 5/00* (2006.01)
  *H04L 25/03* (2006.01)
(58) Field of Classification Search
  CPC ..... H04L 1/189; H04L 1/1893; H04L 1/1819; H04L 5/0007
  See application file for complete search history.

(56) References Cited

U.S. PATENT DOCUMENTS

| | | | | |
|---|---|---|---|---|
| 2009/0252079 | A1* | 10/2009 | Zhang | H04W 72/0446 370/315 |
| 2012/0039264 | A1* | 2/2012 | Kim | H04W 28/04 370/329 |
| 2015/0365926 | A1* | 12/2015 | Long | H04L 5/0094 370/329 |
| 2016/0255609 | A1* | 9/2016 | Kim | H04W 48/16 370/203 |
| 2017/0317793 | A1* | 11/2017 | Jiang | H04L 5/003 |
| 2018/0206246 | A1* | 7/2018 | Zhang | H04L 1/1896 |

OTHER PUBLICATIONS

3GPP, 3rd Generation Partnership Project; Technical Specification Group Radio Access Network; Evloved Universal Terrestrial Radio Access(E-UTRA) 3GPP TS 36.211 Sep. 2016, pp. 1-170.

International Searching Authority, "Notification of Transmittal of the International Search Report and the Written Opinion of the International Searching Authority, or the Declaration", PCT/IB2018/098139, dated Aug. 1, 2018, pp. 1-6.

3GPP, "Objectives for Rel-16 NB-IoT and LTE-M(eMTC)", REL-16 LTE IOT Objectives Companies Views, 3rd Generation Partnership Project (3GPP), F-06921, pp. 1-42.

Catt, System Analysis on TTI Shortening, 3GPP TSG RAN WG1 #83, R1-156613, Nov. 15-22, 2015, pp. 1-8, Anaheim, CA, USA.

Ericsson, System information acquisition time reduction for NB-IoT, 3GPP TSG-RAN WG1 Meeting #92bis, R1-1806881, May 21-25, 2018, pp. 1-8, Busan, Korea.

Lenovo, Motorola Mobility, Design of Use of LTE Control Channel Region, 3GPP TSG RAN WG1 Meeting #95, R1-1812789, Nov. 12-16, 2018, pp. 1-4, Spokane USA.

* cited by examiner

| MCS Index $I_{MCS}$ | Modulation Order $Q_m$ | Modulation Order $Q'_m$ | TBS Index $I_{TBS}$ |
|---|---|---|---|
| 0 | 2 | 2 | 0 |
| 1 | 2 | 2 | 1 |
| 2 | 2 | 2 | 2 |
| 3 | 2 | 2 | 3 |
| 4 | 2 | 2 | 4 |
| 5 | 2 | 4 | 5 |
| 6 | 2 | 4 | 6 |
| 7 | 2 | 4 | 7 |
| 8 | 2 | 4 | 8 |
| 9 | 2 | 4 | 9 |
| 10 | 4 | 6 | 9 |
| 11 | 4 | 6 | 10 |
| 12 | 4 | 6 | 11 |
| 13 | 4 | 6 | 12 |
| 14 | 4 | 6 | 13 |
| 15 | 4 | 6 | 14 |
| 16 | 4 | 6 | 15 |
| 17 | 6 | 6 | 15 |

Table 1 Modulation vs. TBS index

Figure 7A

| $I_{TBS}$ | $N_{PRB}$ | | | | | |
|---|---|---|---|---|---|---|
| | 1 | 2 | 3 | 4 | 5 | 6 |
| 0 | 16 | 32 | 56 | 88 | 120 | 152 |
| 1 | 24 | 56 | 88 | 144 | 176 | 208 |
| 2 | 32 | 72 | 144 | 176 | 208 | 256 |
| 3 | 40 | 104 | 176 | 208 | 256 | 328 |
| 4 | 56 | 120 | 208 | 256 | 328 | 408 |
| 5 | 72 | 144 | 224 | 328 | 424 | 504 |
| 6 | 328 | 176 | 256 | 392 | 504 | 600 |
| 7 | 104 | 224 | 328 | 472 | 584 | 712 |
| 8 | 120 | 256 | 392 | 536 | 680 | 808 |
| 9 | 136 | 296 | 456 | 616 | 776 | 936 |
| 10 | 144 | 328 | 504 | 680 | 872 | 1032 |
| 11 | 176 | 376 | 584 | 776 | 1000 | 1192 |
| 12 | 208 | 440 | 680 | 904 | 1128 | 1352 |

Table 2 Determination of Transport Block Size

Figure 7B

METHOD OF TRANSMITTING DATA OVER INDICATED RESOURCE BLOCKS

FIELD

The subject matter disclosed herein relates generally to wireless communication and more particularly relates to data transmission.

BACKGROUND

The following abbreviations and acronyms are herewith defined, at least some of which are referred to within the following description.

Third Generation Partnership Project ("3GPP"), Cyclic redundancy check ("CRC"), Downlink ("DL"), Downlink Pilot Time Slot ("DwPTS"), Evolved Node B ("eNB"), 5G Node B ("gNB"), European Telecommunications Standards Institute ("ETSI"), Frequency Division Duplex ("FDD"), Frequency-Division Multiplexing ("FDM"), Frequency Division Multiple Access ("FDMA"), Hybrid Automatic Repeat Request ("HARQ"), Hybrid Automatic Repeat Request-Positive Acknowledgement ("HARQ-ACK"), Hybrid Automatic Repeat Request-Negative Acknowledgement ("HARQ-NACK"), Information Element ("IE"), Long Term Evolution ("LTE"), LTE Advanced ("LTE-A"), Media Access Control ("MAC"), Master Information Block ("MIB"), Machine Type Communication ("MTC"), MTC physical downlink control channel ("MPDCCH"), New Radio ("NR"), Physical control format indicator channel ("PCFICH"), Physical Downlink Shared Channel ("PDSCH"), Physical hybrid ARQ indicator channel ("PHICH"), Physical Uplink Control Channel ("PUCCH"), Physical Uplink Shared Channel ("PUSCH"), Quadrature Phase Shift Keyin ("QPSK"), Quadrature amplitude modulation ("QAM"), Radio Resource Control ("RRC"), Received Signal Strength Indicator ("RSSI"), Reference Signal Received Power ("RSRP"), Reference Signal Received Quality ("RSRQ"), Receive ("RX"), System Information Block ("SIB"), Time Division Duplex ("TDD"), Time-Division Multiplexing ("TDM"), Transmit ("TX"), User Entity/Equipment (Mobile Terminal) ("UE"), Uplink ("UL"), Universal Mobile Telecommunications System ("UMTS").

MTC is expected to play an essential role within future 5G systems. It has been identified as an important use case for 5G NR wireless technology. Applications of this type are characterized by huge volumes of end-points and connections, using low-cost devices and modules for wireless sensor networks, connected home, smart metering and so on. It is expected that a new network is able to handle significantly larger numbers of connections efficiently, which is prompting the development of new technologies to support Bandwidth Reduced Low Complexity/Coverage Enhancement (BL/CE) UEs.

Particularly, in the RAN80 plenary meeting of 3GPP, a new work item for Rel.16 eMTC is approved. The objective is to specify the following set of improvements for machine-type communications for BL/CE UEs: Enable the use of LTE control channel region for DL transmission (MPDCCH/PDSCH) to BL/CE UEs. In another aspect, Rel.13 eMTC UEs are not required to receive PDCCH/PCFICH/PHICH channels. The starting OFDM symbol for PDSCH and MPDCCH for Rel.13 eMTC UEs is predefined or indicated by System Information Block 1—Bandwidth Reduced (SIB1-BR).

However, with regard to Rel.16 eMTC/MTC UE, in order to improve the spectrum usage, the legacy LTE control region should be used by Rel.16 eMTC/MTC UE. In another aspect, a new solution enabling the use of the LTE control channel region for DL transmission to BL/CE UEs should consider compatibility with Rel.13 eMTC/MTC UEs.

BRIEF SUMMARY

Transmission of data over legacy LTE control channels such as PDCCH/PCFICH/PHICH can increase spectrum utilization and data throughput, especially for eMTC/MTC UEs that are BL/CE UEs. The present disclosures are aimed at supporting the transmission of data over legacy LTE control channels. In another aspect, in order to be compatible with the processing mechanism of legacy Rel.13 eMTC UEs on the transmission of data, it is preferred for network equipment to enable a physical share (data) channel to carry data firstly, and then enable a physical control channel to carry additional data.

The method and apparatus for data transmission are disclosed. One method proposed for network equipment includes scrambling and modulating coded bits to generate data; mapping the data into a first resource block and a second resource block, both of which form a resource block, wherein the first resource block is from a symbol with an indicated index to a symbol with an end index of the resource block, the second resource block is from a symbol with a start index to a symbol with the indicated index minus one of the resource block.

Further, the method implemented by the network equipment comprises performing encoding of source bits to generate the coded bits, wherein a size of source bits is determined based on a first scaling factor, a first number of resource blocks and a predefined table.

Further, the method implemented by the network equipment comprises mapping the data, which is scrambled and modulated from a first portion of the coded bits, into the first resource block; and mapping the data, which is scrambled and modulated from a second portion of the coded bits, into the second resource block.

The method and apparatus disclosed herein not only provides a mechanism for supporting data transmission on the physical control region, but also provides new mechanisms for scaling source bits and selecting data for different physical channels. Thus, the method and apparatus disclosed herein contribute to increasing spectrum utilization data throughput.

BRIEF DESCRIPTION OF THE DRAWINGS

A more particular description of the embodiments briefly described above will be rendered by reference to specific embodiments that are illustrated in the appended drawings. Given that these drawings depict only some embodiments and are not therefore considered to be limiting in scope, the embodiments will be described and explained with additional specificity and detail through the use of the accompanying drawings, in which:

FIGS. 7A and 7B show Table 1 Modulation vs. TBS Index and Table 2 Determination of Transport Block Size defined in 3GPP TS 36.213, respectively;

DETAILED DESCRIPTION

Figure 1:
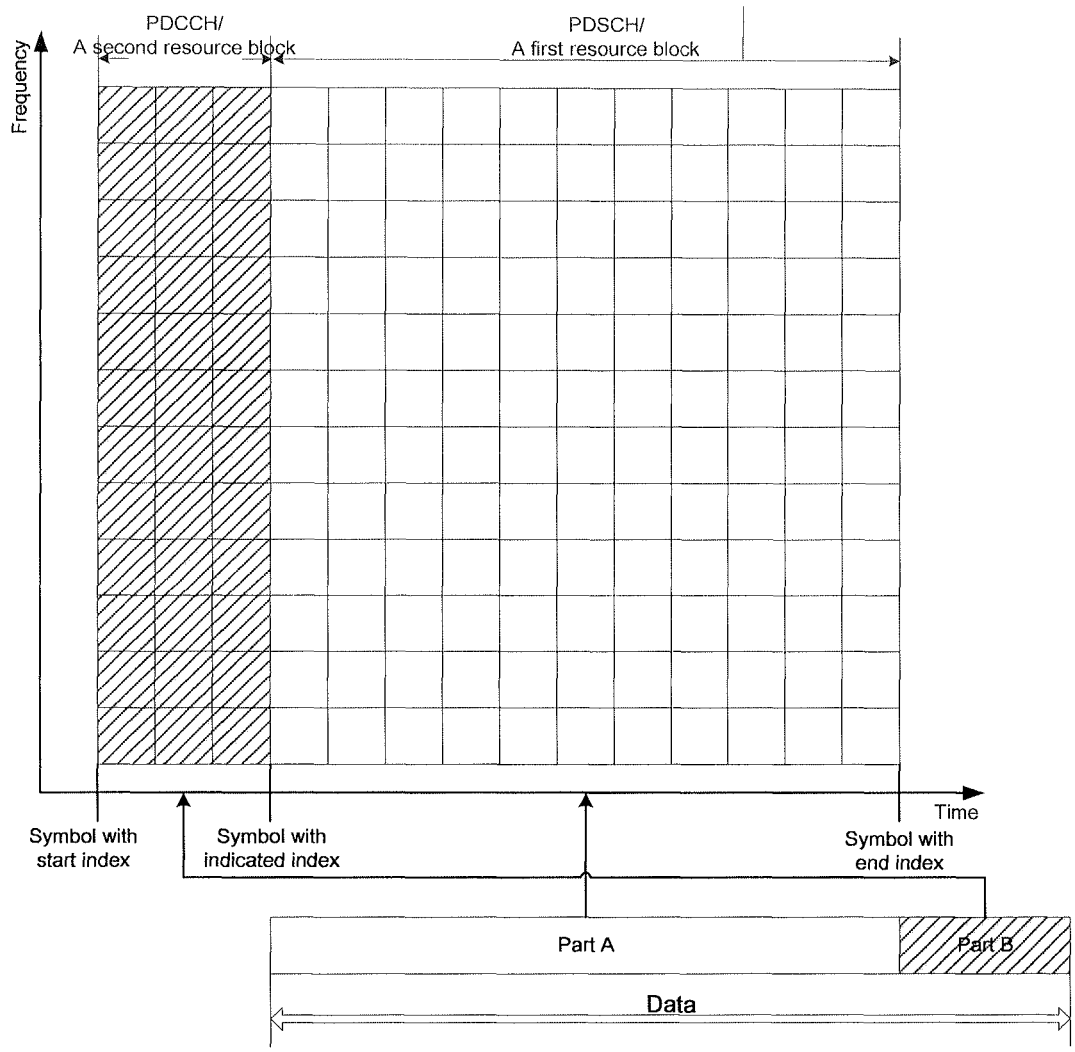
FIG. 1 is a schematic diagram illustrating data mapping into different types of physical channel.

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but not limited to", unless expressly specified otherwise. An enumerated listing of items does not imply that any or all of the items are mutually exclusive, unless expressly specified otherwise. The terms "a", "an", and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions—executed via the processor of the computer or other programmable data processing apparatus—create a means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like numbers refer to like elements in all figures, including alternate embodiments of like elements.

Enhancements of a mechanism for data transmission to BL/CE UEs should be studied to enable the legacy LTE physical control channel, which is not received/solved by the legacy BL/CE UEs, to carry data. In this way, spectrum utilization, data throughput, as well as transmission efficiency, can be increased for the new BL/CE UEs. In the present application, method and apparatus for data transmission to BL/CE UEs are disclosed, which provides a few mechanisms for mapping data into both the legacy LTE physical control channel and physical data channels. Further, the compatibility with the legacy BL/CE UEs is also considered.

It should be noted that the physical channel, resource block, and physical resource block can be used alternatively in the present application. The legacy LTE physical control channel includes but is not limited to PDCCH, PHICH, PCFICH, while the physical share channel includes but is not limited to PDSCH.

FIG. 1 is a schematic diagram illustrating data mapping into different types of physical channels. An illustrative diagram for a resource block is shown in FIG. 1, in which the lateral axis represents a time domain while the vertical axis represents a frequency domain. In one embodiment, the resource block is composed of a first resource block, which can be used for PDSCH to carry data generated from transport blocks (TB), and a second resource block, which can be used for legacy control channel such as PDCCH to carry signaling in a physical layer. As shown in FIG. 1, the first resource block is from a symbol with an indicated index to a symbol with an end index of the resource block, and the second resource block is from a symbol with a start index to a symbol with the indicated index minus one of the resource block. The first resource block is used for PDSCH transmission, and the second resource block is used for legacy control channel such as PDCCH. In a particular MTC case, the second resource block can also use for PDSCH/data transmission. In another aspect, a resource block composed of both the first resource block and second resource block includes a few subcarriers in frequency domain, for example, 12 subcarriers are included in one resource block. As shown in FIG. 1, an example of the resource block includes a region span of 14 symbols in time domain and 12 subcarriers in frequency domain. Particularly, the first resource block includes a region span of the last 11 symbols (symbol #3~symbol #13) in time domain and 12 subcarriers in frequency domain, and the second resource includes a region span of the first 3 symbols (symbol #0~symbol #2) in time domain and 12 subcarriers in the frequency domain, given that the indicated index is 3. It should be understood that the first resource blocks and second resource block may include different regions determined by the indicated index, for example, the first resource block may include a region span of 12 symbols in time domain and 12 subscribers in frequency domain, in the case that the indicated index is 2.

As shown in FIG. 1, part A of the data in the form of symbols is mapped to the first resource block; part B of the data is mapped to the second resource block. The legacy BL/CE UEs are able to receive/resolve part A of the data in the first resource block. Correspondingly, the new BL/CE UEs are able to both receive/resolve part A of the data in the first resource block and part B of the data in the second resource block. Therefore, an extra gain for decoding can be obtained in the case that part B is a portion of part A of the data. Alternatively, spectrum utilization and/or data throughput can be increased if additional source bits are supported in the data, which will be described hereinafter.

Figure 2:
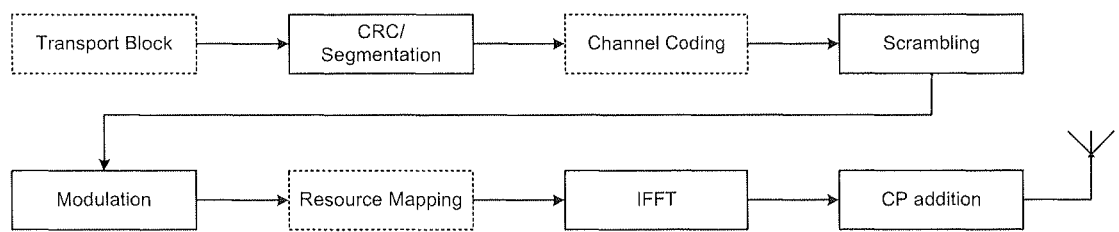
FIG. 2 is a simple flow illustrating data processing in physical layer.

FIG. 2 is a simple flow illustrating data processing in the physical layer of network equipment such as an eNB or a gNB. It should be understood that the processing modules shown in FIG. 2 are not limited to the ones shown. Particularly, additional modules can be added for data processing in the physical layer; alternatively, some shown modules can be removed from the procedure of data processing shown in FIG. 1.

As shown in FIG. 2, transport block containing source bits is received from the MAC layer. A size of source bits is determined based on Table 2 as a predefined table, which is shown in FIG. 7B. With regard to the new BL/CE UEs, a size of source bits can be scaled based on a first scaling factor to increase data throughput, which will be described hereinafter.

CRC is computed for the transport block and appended to the source block bits in order to realize error detection on the UE side. Then segmentation is performed on the transport block in the case that transport block size is more than an allowed code block size. In the case of eMTC and/or NB-IoT, in which the maximum size of transport block is 1000, the segmentation is not needed.

The bits contained in segmented transport block is encoded in the module of channel coding to generate coded bits. To be more particular, the module of channel coding may include a coder such as turbo coder, and a circular buffer. The coded bits from a coder are concentrated into a circular buffer for the coder to be selected. A few mechanisms for selection of coded bits from the circular buffer are described hereinafter. In one embodiment, turbo coded bits consist of three interleaving bit streams, followed by the collection of bits into a circular buffer. The output bits from the circular buffer are determined by the particular bit-selection mechanism as described hereinafter.

The coded bits are then scrambled for the purpose of interference randomization as part of the algorithm executed in the Scrambling block.

The scrambled bits are modulated according to the modulation order specified by a Modulation and Coding Schema (MCS) index $I_{MCS}$ in Table 1 shown in FIG. 7A to generate symbols (for example, QPSK corresponding to modulation order 2, 16 QAM corresponding to modulation order 4, or 64 QAM corresponding to modulation order 6) as data as defined in FIG. 1.

The symbols are mapped into the resource blocks. With regard to the new BL/CE UEs, a few mechanisms for mapping data into both the first resource block and the second resource block are described hereinafter.

A baseband signal is generated through Inverse fast Fourier transform (IFFT), a Cyclic Prefix (CP) is added to the signal in the time domain, and the signal is modulated to a Radio Frequency (not shown) for transmission, which is known for one skilled in the relevant art.

Figure 3:
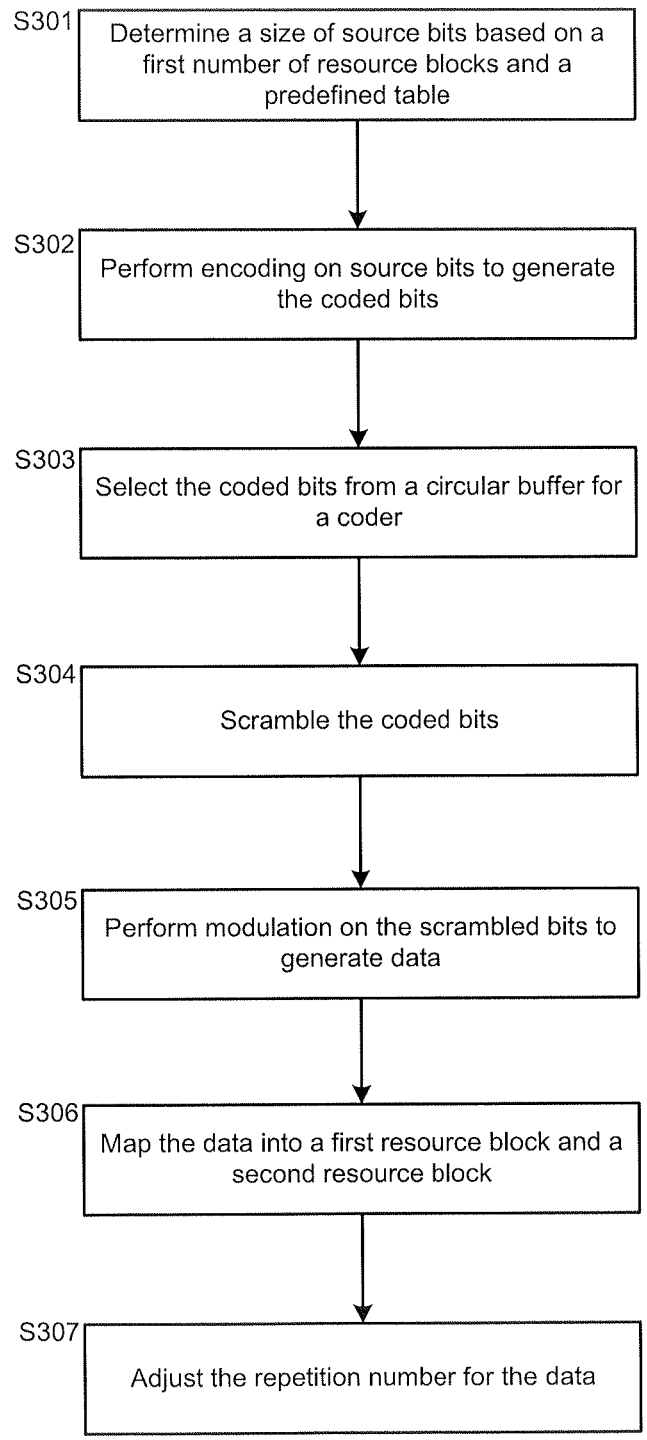
FIG. 3 is a call flow illustrating data mapping into resource blocks according to a first embodiment.
Figure 4:
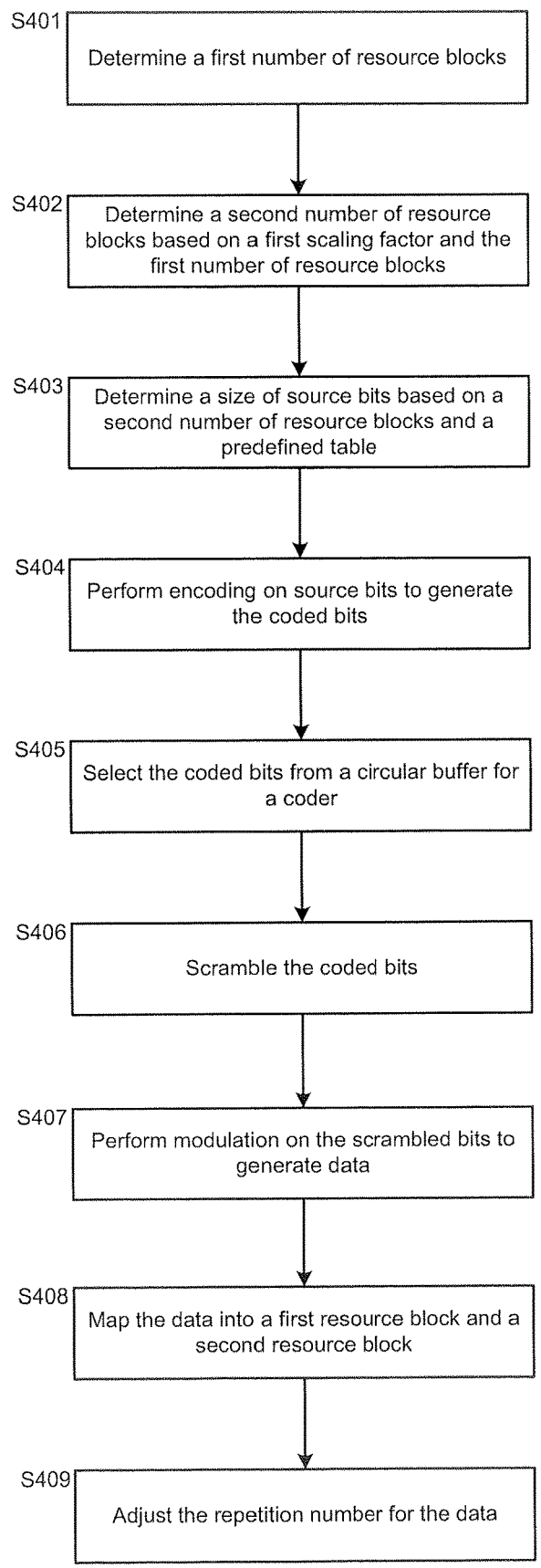
FIG. 4 is a call flow illustrating data mapping into resource blocks according to a second embodiment.
Figure 5:
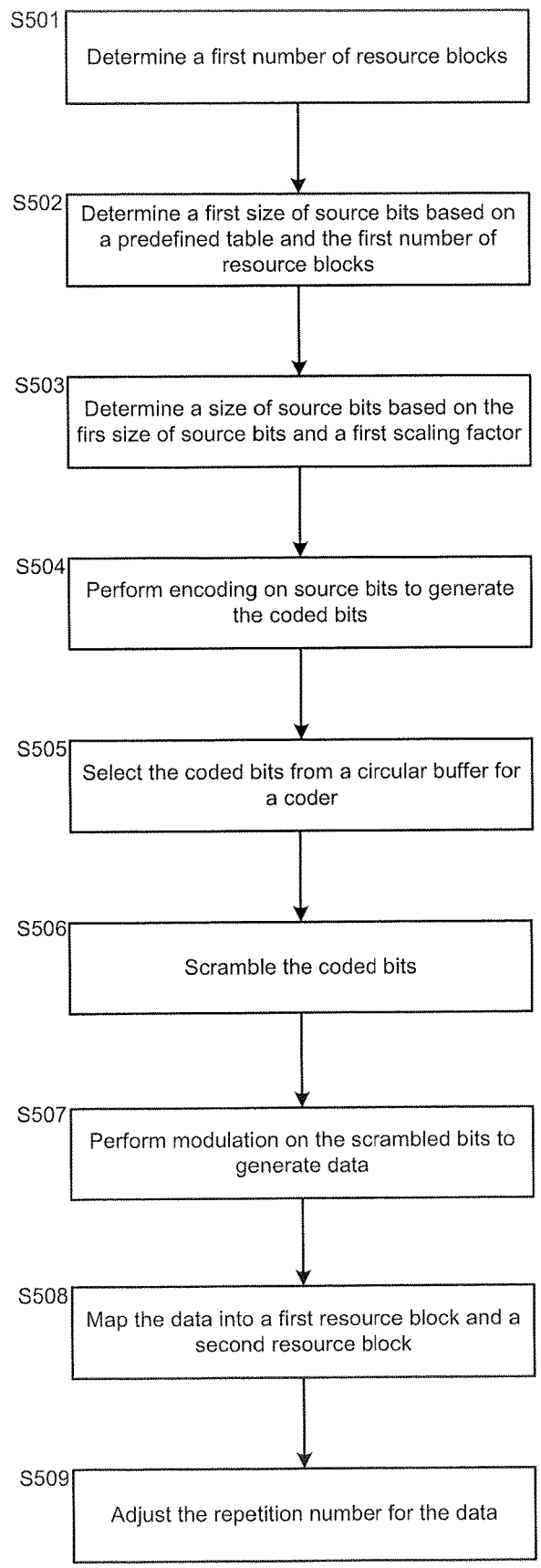
FIG. 5 is a call flow illustrating data mapping into resource blocks according to a third embodiment.

Enhancements on the determination of transport block size, selection of bits from the circular buffer, as well as mapping data into the resource block, are functions identified in the dashed frames shown in FIG. 2 and further described in FIGS. 3-5.

FIG. 3 is a call flow illustrating data mapping into resource blocks according to a first embodiment. The call flow is implemented at network equipment such as eNB/gNB. It should be understood that a inverse call flow is implemented at UE.

In step S301, the network equipment determines a size of source bits based on a first number of resource blocks and a predefined table. Particularly, the network equipment assigns an MCS index $I_{MCS}$ and a first number of resource blocks $N_{PRB}$ on the basis of Channel Quality Indication (CQI), which is based on values such as RSRP/RSRQ/RSSI reported from UE and other information for downlink transmission on PDSCH. Subsequently, the network equipment determines the TBS index $I_{TBS}$ based on the assigned MCS index $I_{MCS}$ defined in 'Table 1 Modulation and TBS Index' shown in FIG. 7A (only a portion thereof is included herein for the purpose of brevity), which is described in 3GPP TS 36.213 and learns a corresponding modulation order which is used in the modulation module shown in FIG. 2. Finally, the network equipment determines a size of source bits based on the determined $I_{TBS}$ and assigned $N_{PRB}$ defined in 'Table 2 Determination of Transport Block Size' (shown in FIG. 7B) as the predefined table mentioned above. This is also described in 3GPP TS 36.213 (only a portion thereof is included herein for the purpose of brevity).

In step S302, the network equipment performs encoding on the source bits to generate the coded bits.

Figure 6:
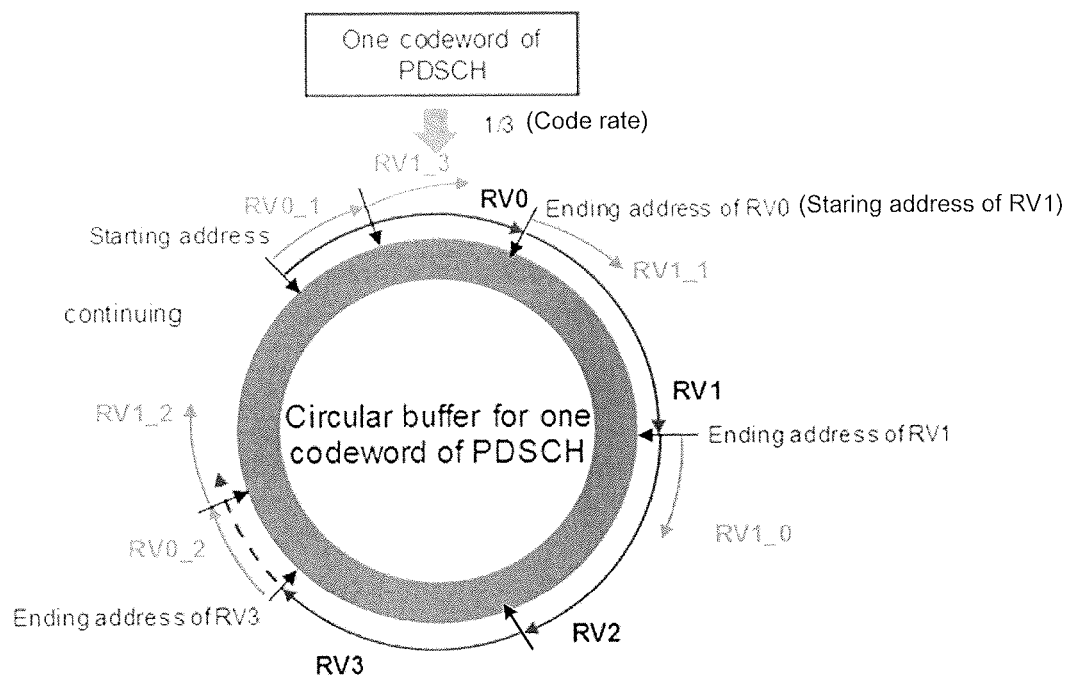
FIG. 6 is a schematic diagram illustrating a circular buffer for a coder applicable for the embodiments.

In step S303, the network equipment selects the coded bits from the circular buffer for the coder. As shown in FIG. 6, which is a schematic diagram illustrating a circular buffer for a coder applicable for the embodiments, coded bits stored in different sections of the circular buffer are associated with different Redundancy Versions (RV), for example marked by RV0, RV1, RV2 and RV3 and specified by a different starting address, are selected to be scrambled, modulated and then mapped into different resource blocks later. Usually, coded bits associated with RV0 are selected for initial transmission, therefore, the starting address of RV0 is also known as the starting address of the circular buffer. It should be understood that although the circular buffer has been described to have four section associated with 4 RVs (i.e. RV0, RV1, RV2 and RV3) are shown in FIG. 6, the number of sections of the circular buffer and hence, the number of associated RVs is not limited to four.

In another embodiment, in order to increase spectrum utilization/data throughput, a second portion of coded bits, which may be stored in RV section of the circular buffer described in FIG. 6 and marked by RVx_y. is to be scrambled, modulated, and then mapped into the second resource block later. Simultaneously, the first portion of coded bits, which is stored in RV section of the circular buffer marked by RVx, is to be scrambled, modulated and then mapped into the first resource blocks later, wherein, 'x' indicates a starting index of RV section of the circular buffer loaded with the first portion of coded bits, for example RV0, RV1, RV2 and RV3. On the contrary, 'y' indicates a different solution for selecting coded bits corresponding to the second resource block. Particularly, with regard to RVx section of the circular buffer loaded with the first portion of coded bits, there is more than one solution for selecting the second portion of coded bits. For example, in the case that coded bits stored in the portion of the circular buffer corresponding to RV1 are selected to be scrambled, modulated, and then mapped into the second resource block/PDSCH shown in FIG. 1, coded bits stored in one of RV1_0, RV1_1, RV1_2 and RV1_3 portions of the circular buffer can be selected to be scrambled, modulated, and then mapped into the second resource block/PDCCH as shown in FIG. 1.

Further, assuming the first portion of coded bits mapping to the first resource block has a first unit length 'M' and the second portion of coded bits mapping to the second resource block has a second unit length 'N', it's possible that the start address of RVx_y is determined according to the following:

the start address of RV1_0 is followed by the end address of RV1;

the starting address of RV1_1 is the start address of RV1;

the address offset between the starting address of RV1_2 and RV0 is multiple times M plus multiple times N;

the starting address of RV1_3 is followed by the end address of RV0_1, which is corresponding to RV0.

In summary, the first portion of coded bits has a first unit length, and is selected from a starting address plus zero or at least one times the first unit length of a circular buffer for a coder. That is, the starting address of the first portion of coded bits '$Add_1$' is determined according to Expression 1 below, where '$Add_0$' is the starting address of the circular buffer for the coder. For example, as mentioned above, the starting address of RV0 is usually used as the starting address of the circular buffer. 'M' is the length of the first portion of coded bits, which is the first unit length mentioned above. "x" is a non-negative integer, i.e. x=0, 1, 2, . . .

$$Add_1 = Add_0 + x \times M \qquad \text{Expression 1}$$

In another aspect, the second portion of coded bits has a second unit length and is selected from the starting address plus zero or at least one times the first unit length plus zero or at least one times the second unit length of the circular buffer. That is, the starting address of the second portion of coded bits '$Add_2$' is determined according to Expression 2, where '$Add_0$' is the starting address of the circular buffer for the coder. As mentioned above, the starting address of RV0 is usually used as the starting address of the circular buffer. 'M' is the length of the first portion of coded bits, which is the first unit length mentioned above. 'N' is the length of the second portion of coded bits, which is the second unit length mentioned above. Both 'x' and 'y' are non-negative integers, i.e. x=0, 1, 2, . . . , $$Add_2 = Add_0 + x \times M + y \times N \qquad \text{Expression 2}$$

Further, the first unit length 'M' is determined according to at least one of a type of resource block, the indicated index and a first modulation type such as QPSK, 16 QAM or 64 QAM. The second unit length 'N' is determined according to at least one of a type of resource block, the indicated index and a second modulation type such as QPSK, 16 QAM or 64 QAM. For example, in the case that the transport block is transmitted over DwPTS of the special subframe in frame structure type 2, the time duration for the corresponding resource block is configured by a higher layer, which is also known that different types of resource blocks may occupy different time domains and/or frequency domains. Further, the available resource elements of the first resource block is determined by the symbols with the indicated index to the symbols with the end index of the first resource block. The available resource elements of the second resource block is determined by the symbol with the start index to the symbols with the indicated index minus 1.

In step S304, the coded bits are scrambled for the purpose of interference randomization.

In step S305, the scramble bits are modulated according to the modulation order $Q_m$ or $Q'_m$ specified by the Modulation and Coding Schema (MCS) index $I_{MCS}$ in 'Table 1 Modulation vs. TBS Index' shown in FIG. 7A.

In step S306, the network equipment maps the data into a first resource block and a second resource block.

In one embodiment, the network equipment maps the data, which is scrambled and modulated from a first portion of the coded bits, into the first resource block, which is from a symbol with the indicated index to a symbol with the end index of the resource block. Then it maps the data, which is scrambled and modulated from a second portion of the coded bits, into the second resource block, which is from a symbol with the start index to a symbol with the indicated index minus one of the resource block. In this way, the legacy BL/CE UEs are still able to receive/resolve data in the first resource block according to the current mechanism, while the new BL/CE UEs are able to receive/resolve data in both the first resource block and the second resource block. Therefore, the spectrum utilization/data throughput is increased for the new BL/CE UEs.

In another embodiment, the network equipment maps the data, which is scrambled and modulated from a first portion of the coded bits, into the first resource block, which is from a symbol with the indicated index to a symbol with the end index of the resource block; and maps a portion of the data in the first resource block into the second resource block, which is from a symbol with the start index to a symbol with the indicated index minus one of the resource block. In this way, the legacy BL/CE UEs are still able to receive/resolve data in PDSCH as/from the first resource block according to the current mechanism, while the new BL/CE UEs are able to receive/resolve data in both the first resource block and the second resource block to obtain extra gains for decoding.

To be more specific, the network equipment maps the data, which is scrambled and modulated from the coded bits, into the first resource block, which is from a symbol of the indicated index to a symbol of an end index of the resource block; and continues to map the data into the second resource block, which is from a symbol of a start index to a symbol of the indicated index minus one of the resource block. In this way, the legacy BL/CE UEs are still able to receive/resolve data in the first resource block according to the current mechanism, while the new BL/CE UEs are able to receive/resolve data in both the first resource block and the second resource block to obtain extra gains for decoding.

In a scenario for eMTC, a transport block directed to eMTC UEs is transmitted multiple times by the network equipment. Usually, the network equipment indicates a first repetition number in control signal, so that the eMTC UEs is able to expect the repetition number of the received transport block. In step S307, optionally, the network equipment indicates a first repetition number in DCI format, and configures the second scaling factor by RRC signaling or the second scaling factor is predefined. The network equipment transmits the data in the resource blocks by a second repetition number related to a second scaling factor. Then BL/CE UEs can derive the actual repetition number (i.e. the second repetition number) according to the first repetition number and the second scaling factor. To be more specific, the second repetition number is a product of the first repetition number and the scaling factor. Assuming that the indicated index is 3, the start index of the resource block is 0 and the end index of the resource block is 13, so the second resource block occupies 3 symbols and the first resource block occupies 11 symbols, yielding the second scaling factor of 11/14. In another example, assuming that the indicated index is 2, the start index of the resource block is 0 and the end index of the resource block is 13, so the second resource block occupies 2 symbols and the first resource block occupies 12 symbols, yielding the second scaling factor of 12/14. Therefore, it should be understood that the second scaling factor is related to the indicated index. However, the second scaling factor may be predefined value or may be also determined according to at least one of followings: a type of Cyclic Prefix (CP), a special subframe configuration defined in 3GPP TS36.211, and the indicated index. Particularly, the second scaling factor is 128*0.75 for special subframe configurations.

Further, the calculated repetition number meets at least one of followings: not less than a fifth threshold and not more than a sixth threshold.

Since the repetition number for transmission of PDSCH may be reduced, early reception of ACK/NACK for transmission of PDSCH based on HARQ can be achieved from the prospective of the network equipment.

In another aspect, although FIG. 3 shows a call flow implemented at the network equipment such as eNB or gNB, it should be understood that a inverse call flow is implemented at UE. Particularly, BL/CE UEs first receives the data in a first resource block and a second resource block, both of which form a resource block, wherein the first resource block is from a symbol with an indicated index to a symbol with an end index of the resource block, the second resource block is from a symbol with a start index to a symbol with the indicated index minus one of the resource block. BL/CE UEs should obtain (demodulates and descrambles) the data in a sequence same as that described in step S306.

FIG. 4 is a call flow illustrating data mapping into resource blocks according to a second embodiment. The enhancement of the call flow in FIG. 4 against that in FIG. 3 is that the size of resource bits is adjusted, given that the second resource block also carries user data.

In step S401, the network equipment assigns a first number of resource blocks $N_{PRB}$, as well as an MCS index $I_{MCS}$, on the basis of Channel Quality Indication (CQI), which is based on values such as RSRP/RSRQ/RSSI reported from UE and other information for downlink transmission on PDSCH.

In step S402, the network equipment determines a second number of resource blocks based on a first scaling factor and the first number of resource blocks. Particularly, the second number of resource blocks is related to the product of the first number of resource blocks and the scaling factor. To be more specific, the second number of resource blocks $N_{PRB}'$ is obtained according to expression 3, given that the maximum number of (physical) resource blocks is 6 for eMTC UE $$N_{PRB}'=\min\{\max\{\lfloor N_{PRB}\times\alpha\rfloor,1\},6\} \quad \text{expression 3}$$

Wherein, $\alpha$ is the first scaling factor.

Assuming that the indicated index is 3, the start index of the resource block is 0 and the end index of the resource block is 13, so the second resource block occupies 3 symbols and the first resource block occupies 11 symbols, yielding the first scaling factor of 14/11. In another example, assuming that the indicated index is 2, the start index of the resource block is 0 and the end index of the resource block is 13, so the second resource block occupies 2 symbols and the first resource block occupies 12 symbols, yielding the first scaling factor of 14/11. Therefore, it should be understood that the first scaling factor is related to the indicated index. However, the first scaling factor may be predefined value or may be also determined according to at least one of following: a type of Cyclic Prefix (CP), a special subframe configuration, and the indicated index. Particularly, the first scaling factor α may be 0.75 for special subframe configurations 9 and 10 with normal cyclic prefix or special subframe configuration 7 with extended cyclic prefix the type and is 0.375 for other special subframe configurations.

According to expression 3, the second number of resource blocks has both a maximum value (i.e. 6) and a minimum value (i.e. 1). However, the second number of resource blocks may be limited by either the maximum value or the minimum value. That is, the second number of resource blocks meets at least one of following: not less than a first threshold and not more than a second threshold.

In step S403, the network equipment determines a size of source bits based on a second number of resource blocks $N_{PRB}'$ and 'Table 2 Determination of Transport Block Size' (shown in FIG. 7B) as the predefined table mentioned above.

For example, assuming that α is 14/11, a first number of resource blocks $N_{PRB}$ is 4 and MCS index is 6, then $I_{TBS}$ is 6 according to the MCS index with the value of 6 in Table 1 shown in FIG. 7A, the second number of resource blocks $N_{PRB}'$ is 5 according to expression 3. Therefore the size of source bits is 504 according to the TBS index $I_{TBS}$ with a value of 6 and the second number of resource blocks $N_{PRB}'$ with a value of 5 in Table 2 shown in FIG. 7B. In another aspect, without the application of the bits scaling, the size of source bits is 392 according to the TBS index $I_{TBS}$ with a value of 6 and the first number of resource blocks $N_{PRB}$ with a value of 4 in Table 2 shown in FIG. 7B.

The descriptions for steps S404-S409 in FIG. 4 are similar with that for steps S302-S307 in FIG. 3. Thus, the descriptions thereof are omitted for the purpose of brevity.

FIG. 5 is a call flow illustrating data mapping into resource blocks according to a third embodiment. The enhancement of the call flow in FIG. 5 against that in FIG. 3 is that the size of resource bits is adjusted, given that the second resource block also carries user data.

In step S501, the network equipment assigns a first number of resource blocks $N_{PRB}$, as well as an MCS index $I_{MCS}$, on the basis of Channel Quality Indication (CQI) which is based on values such as RSRP/RSRQ/RSSI reported from UE and other information for downlink transmission on PDSCH.

In step S502, the network equipment determines a first size of source bits based on 'Table 2 Determination of Transport Block Size' (shown in FIG. 7B) as the predefined table and the first number of resource blocks.

In step S503, the network equipment determines a size of source bits based on the first size of source bits $N_{TBS}$ and a first scaling factor. Particularly, the size of source bits is related to the product of the first size of source bits and the scaling factor. To be more specific, the size of source bits $N_{TBS}'$ is obtained according to expression 4, given that the maximum number of (physical) resource blocks is 6 for eMTC UE $$N_{TBS}'=\min\{\max\{\lfloor N_{TBS}\times\alpha\rfloor,40\},1000\} \qquad \text{expression 4}$$

Wherein, α is the first scaling factor.

Assuming that the indicated index is 3, the start index of the resource block is 0 and the end index of the resource block is 13, so the second resource block occupies 3 symbols and the first resource block occupies 11 symbols, yielding the first scaling factor of 14/11. In another example, assuming that the indicated index is 2, the start index of the resource block is 0 and the end index of the resource block is 13, so the second resource block occupies 2 symbols and the first resource block occupies 12 symbols, yielding the first scaling factor of 14/11. Therefore, it should be understood that the first scaling factor is related to the indicated index. However, the first scaling factor may be predefined value or may be also determined according to at least one of following: a type of Cyclic Prefix (CP), a special subframe configuration, and the indicated index. Particularly, the first scaling factor α may be 0.75 for special subframe configurations 9 and 10 with normal cyclic prefix or special subframe configuration 7 with extended cyclic prefix the type and is 0.375 for other special subframe configurations.

According to expression 4, the size of source bits has both a maximum value (i.e. 1000) and a minimum value (i.e. 40). However, the size of source bits may be limited by either the maximum value or the minimum value. That is, the size of source bits meets at least one of following: not less than a third threshold and not more than a fourth threshold. In another aspect, in order to comply with the current design for size of source bits, the size of source bits $N_{TBS}'$ is rounded to the nearest value in the predefined table, for example, it is rounded down to the nearest value in the predefined table.

For example, assuming that a is 14/11, a first number of resource blocks $N_{PRB}$ is 4 and MCS index is 6, then $I_{FBs}$ is 6 according to the MCS index with the value of 6 in Table 1 shown in FIG. 7A, the first size of source bits is 392 according to the TBS index $I_{TBS}$ with a value of 6 and the first number of resource blocks $N_{PRB}$ with a value of 4 in Table 2 shown in FIG. 7B, which is also a size of source bits without application of the bits scaling. Therefore, the size of source bits is 498 calculated by expression 4 and then is adjusted to be 472 by rounding down 498 to the nearest value in Table 2.

The descriptions for steps S504-S509 in FIG. 5 are similar with those for steps S302-S307 in FIG. 3. Thus, the descriptions therein are omitted for the purpose of brevity.

One skilled in the relevant art will recognize that the process described in FIGS. 2-4 does not need to be practiced in the sequence shown in the Figures, and may be practiced without one or more of the specific steps or with other steps not shown in the Figures.

Figure 8:
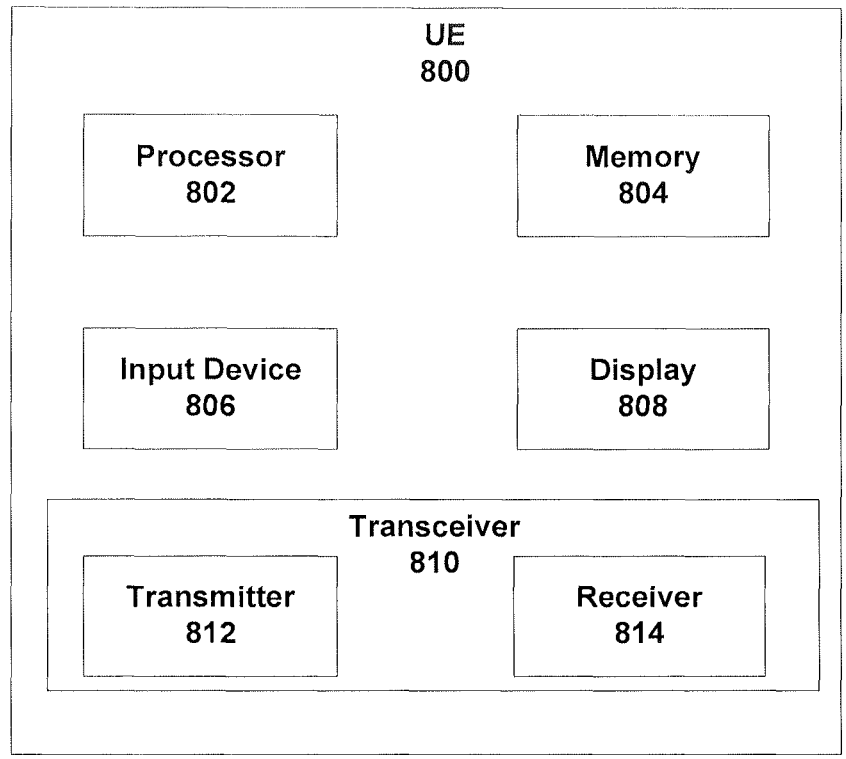
FIG. 8 is a schematic block diagram illustrating components of a UE such as UE according to one embodiment.

FIG. 8 is a schematic block diagram illustrating components of a UE such as BL/CE UEs according to one embodiment.

UE 800 is an embodiment of the UE described from FIG. 2 to FIG. 4. Furthermore, UE 800 may include a processor 802, a memory 804, and a transceiver 810. In some embodiments, UE 800 may include an input device 806 and/or a display 808. In certain embodiments, the input device 806 and the display 808 may be combined into a single device, such as a touch screen.

The processor 802, in one embodiment, may include any known controller capable of executing computer-readable instructions and/or capable of performing logical operations. For example, the processor 802 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 802 executes instructions stored in the memory 804 to perform the methods and routines described herein. The processor 802 is communicatively coupled to the memory 804, the input device 806, the display 808, and the transceiver 810.

In some embodiments, the processor 802 controls the transceiver 810 to receive various configuration and data from Network Equipment 900. In certain embodiments, the processor 802 may monitor DL signals received via the transceiver 810 for specific messages.

The memory 804, in one embodiment, is a computer readable storage medium. In some embodiments, the memory 804 includes volatile computer storage media. For example, the memory 804 may include a RAM, including dynamic RAM ("DRAM"), synchronous dynamic RAM ("SDRAM"), and/or static RAM ("SRAM"). In some embodiments, the memory 804 includes non-volatile computer storage media. For example, the memory 804 may include a hard disk drive, a flash memory, or any other suitable non-volatile computer storage device. In some embodiments, the memory 804 includes both volatile and non-volatile computer storage media. In some embodiments, the memory 804 stores data relating to trigger conditions for transmitting the measurement report to Network Equipment 800. In some embodiments, the memory 804 also stores program code and related data, such as an operating system or other controller algorithms operating on UE 800.

UE 800 may optionally include an input device 806. The input device 806, in one embodiment, may include any known computer input device including a touch panel, a button, a keyboard, a stylus, a microphone, or the like. In some embodiments, the input device 806 may be integrated with the display 808, for example, as a touch screen or similar touch-sensitive display. In some embodiments, the input device 806 includes a touch screen such that text may be input using a virtual keyboard displayed on the touch screen and/or by handwriting on the touch screen. In some embodiments, the input device 806 includes two or more different devices, such as a keyboard and a touch panel. In certain embodiments, the input device 806 may include one or more sensors for monitoring an environment of UE 800.

UE 800 may optionally include a display 808. The display 808, in one embodiment, may include any known electronically controllable display or display device. The display 808 may be designed to output visual, audible, and/or haptic signals. In some embodiments, the display 808 includes an electronic display capable of outputting visual data to a user. For example, the display 808 may include, but is not limited to, an LCD display, an LED display, an OLED display, a projector, or a similar display device capable of outputting images, text, or the like to a user. As another, non-limiting, example, the display 808 may include a wearable display such as a smart watch, smart glasses, a heads-up display, or the like. Further, the display 808 may be a component of a smart phone, a personal digital assistant, a television, a table computer, a notebook (laptop) computer, a personal computer, a vehicle dashboard, or the like.

In certain embodiments, the display 808 may include one or more speakers for producing sound. For example, the display 808 may produce an audible alert or notification (e.g., a beep or chime). In some embodiments, the display 808 includes one or more haptic devices for producing vibrations, motion, or other haptic feedback. In some embodiments, all or portions of the display 808 may be integrated with the input device 806. For example, the input device 806 and display 808 may form a touch screen or similar touch-sensitive display. In other embodiments, the display 808 may be located near the input device 806.

The transceiver 810, in one embodiment, is configured to communicate wirelessly with Network Equipment 800. In certain embodiments, the transceiver 810 comprises a transmitter 812 and a receiver 814. The transmitter 812 is used to transmit UL communication signals to Network Equipment 900 and the receiver 814 is used to receive DL communication signals from Network Equipment 900. For example, the transmitter 812 may transmit a HARQ-ACK codebook including feedbacks for one or more DL transmissions. As another example, the receiver 814 may receive various configurations/data from Network Equipment 900.

The transmitter 812 and the receiver 814 may be any suitable types of transmitters and receivers. Although only one transmitter 812 and one receiver 814 are illustrated, the transceiver 810 may have any suitable number of transmitters 812 and receivers 814. For example, in some embodiments, UE 800 includes a plurality of transmitter 812 and receiver 814 pairs for communicating on a plurality of wireless networks and/or radio frequency bands, each transmitter 812 and receiver 814 pair configured to communicate on a different wireless network and/or radio frequency band than the other transmitter 812 and receiver 814 pairs.

Figure 9:
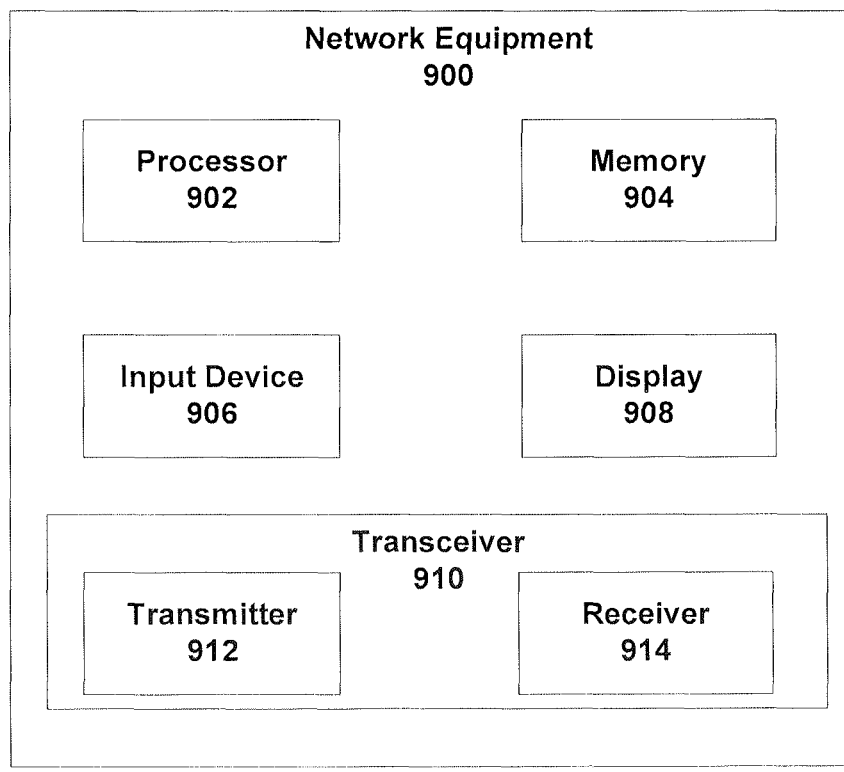
FIG. 9 is a schematic block diagram illustrating components of a network equipment according to one embodiment.

FIG. 9 is a schematic block diagram illustrating components of a network equipment according to one embodiment.

Network Equipment 900 includes one embodiment of eNB/gNB described from FIG. 2 to FIG. 4. Furthermore, Network Equipment 900 may include a processor 902, a memory 904, an input device 906, a display 908, and a transceiver 910. As may be appreciated, the processor 902, the memory 904, the input device 906, and the display 908 may be substantially similar to the processor 902, the memory 904, the input device 906, and the display 908 of UE 800, respectively.

In some embodiments, the processor 902 controls the transceiver 910 to transmit DL signals/data to UE 800. The processor 902 may also control the transceiver 910 to receive UL signals/data from UE 800. For example, the processor 902 may control the transceiver 910 to receive a HARQ-ACK codebook including feedbacks for one or more DL transmissions. In another example, the processor 902 may control the transceiver 910 to transmit a DL signals for various configurations to UE 800, as described above.

The transceiver 910, in one embodiment, is configured to communicate wirelessly with UE 800. In certain embodiments, the transceiver 910 comprises a transmitter 912 and a receiver 914. The transmitter 912 is used to transmit DL communication signals to UE 800 and the receiver 914 is used to receive UL communication signals from UE 800. For example, the receivers 914 may receive a HARQ-ACK codebook from UE 800. As another example, the transmitter 912 may transmit the various configurations/data of Network Equipment 900.

The transceiver 910 may communicate simultaneously with a plurality of UE 800. For example, the transmitter 912 may transmit DL communication signals to UE 800. As another example, the receiver 914 may simultaneously receive UL communication signals from UE 800. The transmitter 912 and the receiver 914 may be any suitable types of transmitters and receivers. Although only one transmitter 912 and one receiver 914 are illustrated, the transceiver 910 may have any suitable number of transmitters 912 and receivers 914. For example, Network Equipment 800 may serve multiple cells and/or cell sectors, wherein the transceiver 910 includes a transmitter 912 and a receiver 914 for each cell or cell sector.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A base station, comprising:
   at least one memory; and
   at least one processor coupled with the at least one memory and configured to cause the base station to:
   scramble and modulate coded bits for a plurality of redundancy versions (RVs) to generate data;
   map a first RV of the plurality of RVs into a first downlink resource block and a second RV of the plurality of RVs into a second downlink resource block, both of which form a combined downlink resource block for a transmission of a single transport block and in which the first downlink resource block and the second downlink resource block of the combined downlink resource block are consecutive in a time domain, wherein the first downlink resource block is from a symbol with an indicated index of the combined downlink resource block to a symbol with an end index of the combined downlink resource block, the second downlink resource block is from a symbol with a start index to a symbol with an index of the combined downlink resource block equal to the indicated index minus one; and
   transmit the data in the combined downlink resource block according to the mapping.

2. The base station of claim 1, wherein the at least one processor is configured to cause the base station to encode source bits to generate the coded bits, wherein a size of the source bits is determined based on a first scaling factor, a first number of resource blocks, and a predefined table.

3. The base station of claim 2, wherein:
   a first size of the source bits is determined based on the first number of resource blocks and the predefined table; and
   the size of the source bits is determined based on the first scaling factor and the first size of the source bits.

4. The base station of claim 1, wherein the at least one processor is configured to cause the base station to further comprising:
   map the first RV of the plurality of RVs, which is scrambled and modulated from a first portion of the coded bits, into the first downlink resource block; and
   map the second RV of the plurality of RVs, which is scrambled and modulated from a second portion of the coded bits, into the second downlink resource block.

5. The base station of claim 1, wherein a first portion of the coded bits are used to generate the mapping into the first downlink resource block, and a second portion of the coded bits are used to generate the mapping into the second downlink resource block.

6. The base station of claim 1, wherein the at least one processor is configured to cause the base station to:
   map the first RV of the plurality of RVs, which is scrambled and modulated from the coded bits, into the first downlink resource block; and
   map the second RV of the plurality of RVs into the second downlink resource block.

7. A user equipment (UE), comprising:
   at least one memory; and
   at least one processor coupled with the at least one memory and configured to cause the UE to:
   receive data comprising a first redundancy version (RV) of a plurality of RVs in a first downlink resource block and a second RV of the plurality of RVs in a second downlink resource block as a transmission of a single transport block and in which the first downlink resource block and the second downlink resource block of a combined downlink resource block are consecutive in a time domain, wherein the first downlink resource block is from a symbol with an indicated index of the combined downlink resource block to a symbol with an end index of the combined downlink resource block, the second downlink resource block is from a symbol with a start index to a symbol with an index of the combined downlink resource block equal to the indicated index minus one; and
   demodulate and descramble the data to obtain coded bits.

8. The UE of claim 7, wherein the at least one processor is configured to cause the UE to decode the coded bits to obtain source bits, wherein a size of the source bits is determined based on a first scaling factor, a first number of resource blocks, and a predefined table.

9. The UE of claim 8, wherein:
   a first size of the source bits is determined based on the first number of resource blocks and the predefined table; and
   the size of the source bits is determined based on the first scaling factor and the first size of the source bits.

10. The UE of claim 7, wherein the at least one processor is configured to cause the UE to:
    demodulate and descramble the data in the first downlink resource block to obtain a first portion of the coded bits; and
    demodulate and descramble the data in the second downlink resource block to obtain a second portion of the coded bits.

11. The UE of claim 10, wherein:
    the first portion of the coded bits has a first unit length;
    the second portion of the coded bits has a second unit length; and
    the first unit length is determined according to at least one of a type of the combined downlink resource block, the indicated index, and a first modulation type, and the second unit length is determined according to at least one of the type of the combined downlink resource block, the indicated index, and a second modulation type.

12. The UE of claim 7, wherein the at least one processor is configured to cause the UE to:
    demodulate and descramble the data in the first downlink resource block to obtain a first potion of the coded bits; and
    demodulate and descramble the data in the second downlink resource block to obtain a second portion of the coded bits.

13. The UE of claim 7, wherein the at least one processor is configured to cause the UE to:
    demodulate and descramble the data in the first downlink resource block to obtain the coded bits; and
    demodulate and descramble the data in the second downlink resource block to obtain the coded bits.

14. A method performed by a user equipment (UE), the method comprises:
    receiving data comprising a first redundancy version (RV) of a plurality of RVs in a first downlink resource block and a second RV of the plurality of RVs in a second downlink resource block at the UE as a transmission of a single transport block and in which the first downlink resource block and the second downlink resource block of a combined downlink resource block are consecutive in a time domain, wherein the first downlink resource block is from a symbol with an indicated index of the combined downlink resource block to a symbol with an end index of the combined downlink resource block, the second downlink resource block is from a symbol with a start index to a symbol with an index of the combined downlink resource block equal to the indicated index minus one; and demodulating and scrambling the data to obtain coded bits.

15. The method of claim 14, further comprising decoding the coded bits to generate source bits, wherein a size of the source bits is determined based on a first scaling factor, a first number of resource blocks, and a predefined table.

16. The method of claim 15, wherein:

a first size of the source bits is determined based on the first number of resource blocks and the predefined table; and the size of the source bits is determined based on the first scaling factor and the first size of the source bits.

17. The method of claim 14, further comprising:

demodulating and descrambling the data in the first downlink resource block to obtain a first portion of the coded bits; and demodulating and descrambling the data in the second downlink resource block to obtain a second portion of the coded bits.

18. The method of claim 17, wherein:

the first portion of the coded bits has a first unit length;

the second portion of the coded bits has a second unit length; and the first unit length is determined according to at least one of a type of the combined downlink resource block, the indicated index, and a first modulation type, and the second unit length is determined according to at least one of the type of the combined downlink resource block, the indicated index, and a second modulation type.

19. The method of claim 14, further comprising:

demodulating and descrambling the data in the first downlink resource block to obtain a first potion of the coded bits; and demodulating and descrambling the data in the second downlink resource block to obtain a second potion of the coded bits.

20. The method of claim 14, further comprising:

demodulating and descrambling the data in the first downlink resource block to obtain the coded bits; and demodulating and descrambling the data in the second downlink resource block to obtain the coded bits.

* * * * *